United States Patent [19]

Swoveland

[11] Patent Number: 4,643,042
[45] Date of Patent: Feb. 17, 1987

[54] CONTROL CABLE ATTACHMENT ASSEMBLY

[75] Inventor: Jack E. Swoveland, Laurinburg, N.C.

[73] Assignee: Dana Corporation, Toledo, Ohio

[21] Appl. No.: 757,657

[22] Filed: Jul. 22, 1985

[51] Int. Cl.$^4$ ............................................. F16L 1/10
[52] U.S. Cl. ............................ 74/501.5 R; 74/502
[58] Field of Search ............... 74/501.5, 502.4, 502

[56] References Cited

U.S. PATENT DOCUMENTS

| | | | |
|---|---|---|---|
| 2,256,697 | 9/1941 | Weber | 74/502 |
| 2,448,968 | 9/1948 | Franck | 74/502 |
| 3,443,452 | 5/1969 | Shontz | 74/502 |
| 3,643,523 | 2/1972 | Mihaila | 74/502 |
| 3,645,150 | 2/1972 | Crossland | 74/501 P |
| 4,261,221 | 4/1981 | Kobayashi | 74/501 R |
| 4,263,998 | 4/1981 | Moriya | 74/512 |
| 4,535,646 | 8/1985 | Kohler | 74/502 |

Primary Examiner—Albert J. Makay
Assistant Examiner—David W. Westphal
Attorney, Agent, or Firm—Marshall & Melhorn

[57] ABSTRACT

The present invention concerns a control cable attachment assembly for adjustably supporting one end of a flexible control cable relative to an associated support member. The control cable includes an outer casing having a wire cable slidably mounted therein. One end of the outer casing is provided with an externally threaded portion. A snap-in adapter element includes an aperture for slidably receiving the externally threaded end of the cable casing. The snap-in adapter element can be snapped into a cooperating mounting hole provided on an associate support member. An adjusting nut is threadably mounted on the cable casing adjacent one end of the adapter for locating the cable housing in a predetermined fixed position relative to the support member, and a resilient rubber retaining ring is mounted on the threaded cable casing on the opposite side of the adapter element for maintaining the adapter element in its selected position.

6 Claims, 2 Drawing Figures

4,643,042

CONTROL CABLE ATTACHMENT ASSEMBLY

BACKGROUND OF THE INVENTION

The present invention relates, in general, to a means for attaching one end of a control cable to an associated support member and, in particular, to an attachment means wherein the axial position of the cable casing can be adjusted relative to the support member.

Various means have been proposed for adjustably attaching one end of a flexible control cable to an associated mounting bracket. For example, U.S. Pat. No. 4,263,998 to Moriya discloses a flexible cable attachment assembly wherein one end of the cable casing is provided with external threads, and a wing nut is threaded onto the end of the cable casing and abuts against an associated mounting plate. The wing nut can be utilized to adjust the position of the cable casing relative to the mounting plate.

Some adjustable cable attachment devices are provided with snap-in adapter elements which enable one end of the cable assembly to be quickly attached to or disconnected from an associated mounting plate. For example, both U.S. Pat. Nos. 3,645,150 to Crossland and 4,261,221 to Kobayashi disclose cable attachment devices wherein the one end of the cable casing is provided with external threads, and is threadably secured to an internally threaded adapter which snaps into a cooperating mounting hole in a mounting bracket.

SUMMARY OF THE INVENTION

The present invention relates to a unique cable attachment assembly for adjustably securing one end of a cable casing to an associated support member. The cable attachment assembly includes a snap-in adapter element in combination with a threaded adjusting nut for enabling the position of the cable casing to be adjusted relative to the adapter element both prior to and after the adapter element is secured to an associated support member.

More specifically, the attachment assembly includes a control cable having an outer casing surrounding a slidable wire cable. The one end of the outer casing of the control cable is provided with an externally threaded portion. An adapter element includes a central aperture for slidably receiving the threaded end of the cable casing. The adapter element also includes means, such as a snap-in portion, for securing the adapter element within a cooperating mounting hole provided in the associated support member. A threaded adjusting nut is threadably mounted on the end of the cable casing adjacent the adapter for adjustably locating the cable casing in a selected position relative to the support member. Also, means are provided for maintaining the adapter element adjacent the adjusting nut.

DESCRIPTION OF THE PREFERRED EMBODIMENT

Figure 1:
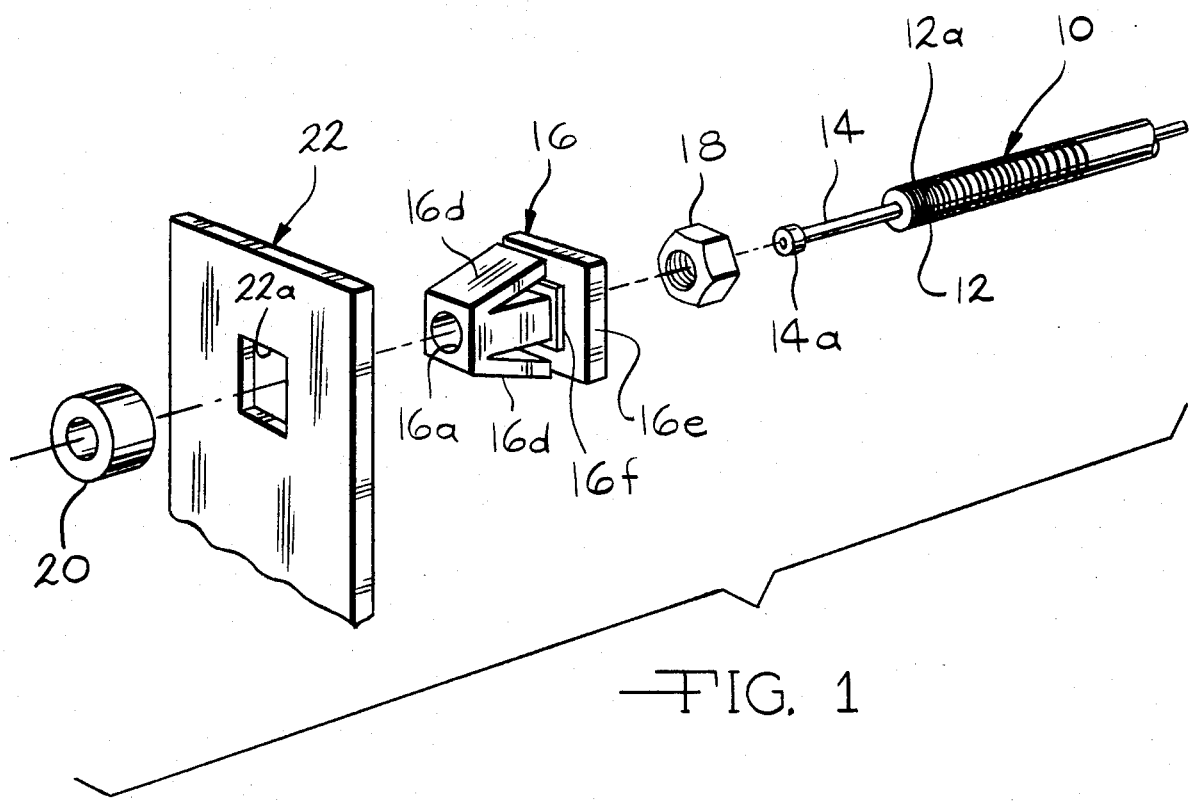
FIG. 1 is a exploded perspective view illustrating the individual elements which comprise the control cable attachment assembly according to the present invention.
Figure 2:
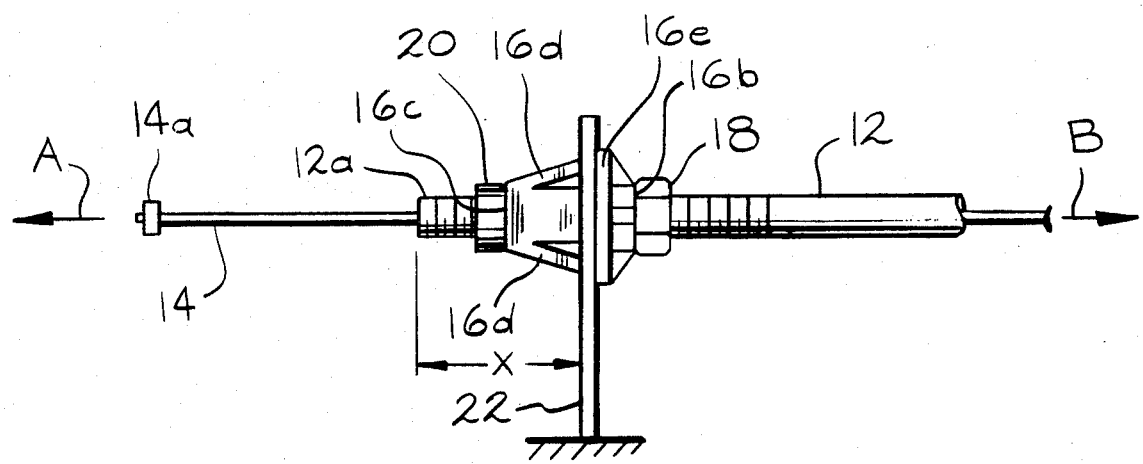
FIG. 2 is a side elevational view illustrating the components of FIG. 1 in an assembled position.

Referring to FIG. 1, there are shown the individual elements which comprise the control cable attachment assembly of the present invention. FIG. 2 illustrates the components in an assembled condition.

The assembly includes a flexible control cable 10 having an outer casing 12 which surrounds a wire cable 14 slidably mounted therein. The outer end of the wire cable is provided with a ferrule 14a which is adapted to be connected to the device controlled by the cable 10. For example, it has been found desirable to utilize the attachment assembly of the present invention in mounting a control cable of a vehicle speed control system. In such a system, the cable ferrule 14a is typically coupled to the vehicle throttle linkage (not shown) which spring biases the wire cable 14 in a direction A, as shown in FIG. 2. The opposite end of the wire cable can be coupled to a speed control servo unit (not shown) which is adapted to pull the cable in a direction B opposite the direction A.

The cable casing 12 includes an externally threaded portion 12a formed on the one end thereof which, as will be discussed, is utilized to adjustably position the cable casing. A snap-in adapter 16 is provided with a central aperture 16a for receiving the threaded end portion 12a of the casing 12. Prior to slipping the adapter 16 over the threaded end portion 12a, an adjusting nut 18 is threaded onto the threaded end portion 12a such that, when the adapter 16 is slipped over the end portion 12a, the one end 16b of the adapter 16 is adjacent to and engages the nut 18 to position the adapter 16 in a selected axial position along the cable casing.

An elastomeric retaining ring 20 can then be stretched over the end of the cable casing 12 and positioned adjacent the opposite end 16c of the adapter 16. The elastomeric ring 20 frictionally engages the threaded end portion 12a to maintain the adapter 16 in engagement with the nut 18 and in a selected axial position along the cable casing.

The adapter element 16 is specifically designed to be quickly snapped into a square mounting hole 22a provided on an associated fixed support member 22. The adapter element 16 includes a pair of outwardly extending tabs 16d. As the adapter element is inserted through the mounting hole 22a, the tabs 16d will be temporarily compressed and then, once the outer end of the tabs have passed through the hole 22a, the tabs 16d will expand radially outwardly to maintain the inner surface of an adapter flange 16e in engagement with the support member 22. A square-shaped raised portion 16f (shown in FIG. 1) formed on the inner surface of the flange 16e corresponds in size and shape to the mounting hole 22a to prevent relative rotation of the adapter 16 after insertion into the hole 22a.

The attachment assembly of the present invention enables the distance X between the end of the cable casing 12 and the support member 22 to be readily adjusted. The use of the snap-in adapter element in combination with the threaded adjusting nut enables the assembly to be adjusted prior to attachment to the associated support member and, after the cable assembly has been attached to the support member, enables further fine adjustment of the cable casing without removing the adapter from the support member.

It should be noted that the cable attachment assembly of the present invention has been illustrated and described in what is considered to represent its preferred embodiment. However, it should be noted that the invention may be practiced otherwise than as specifically illustrated and described without departing from the spirit or scope of the attached claims.

What is claimed is:

1. A control cable attachment assembly comprising:
   a control cable having an outer casing surrounding a relatively movable cable element, one end of said outer casing provided with an externally threaded portion;
   an adapter element having an aperture formed therein for slidably receiving the externally threaded end of said cable casing;
   means for non-rotatably and latchingly securing said adapter element relative to a support member;
   an adjusting nut threadably mounted on the externally threaded end of said cable casing adjacent one end of said adapter element for adjustably positioning said cable casing in a predetermined position relative to the support member; and
   means for maintaining said adapter element adjacent said adjusting nut.

2. The control cable attachment assembly according to claim 1 wherein said means for maintaining is mounted on said cable casing adjacent the end of said adapter element which is opposite said adjusting nut.

3. The control cable attachment assembly according to claim 2 wherein said means for maintaining is an unthreaded elastomeric retainer frictionally held about the externally threaded end of said cable casing.

4. A control cable attachment assembly comprising:
   a control cable having an outer casing surrounding a relatively movable cable element, one end of said outer casing provided with an externally threaded portion;
   an adapter element having an aperture formed therein for slidably receiving the externally threaded end of said cable casing, said adapter element being insertable into a cooperating mounting hole provided in a support member, said adapter element including means for non-rotatably and latchingly retaining said adapter element within the hole in the support member;
   an adjusting nut threadably mounted on the externally threaded end of said cable casing adjacent one end of said adapter element for adjustably positioning said cable casing in a predetermined position relative to the support member; and
   means for maintaining said adapter element adjacent said adjusting nut.

5. The control cable attachment assembly according to claim 4 wherein said means for maintaining is mounted on said cable casing adjacent the end of said adapter element opposite said adjusting nut.

6. The control cable attachment assembly according to claim 5 wherein said means for maintaining is an unthreaded elastomeric retainer frictionally held about the externally threaded end of said cable casing.

* * * * *